United States Patent
Lai et al.

(10) Patent No.: US 7,227,743 B2
(45) Date of Patent: Jun. 5, 2007

(54) ELECTRONIC DEVICE

(75) Inventors: Chih-Hsi Lai, Sindian (TW); Wen-Ta Cheng, Jhonghe (TW)

(73) Assignee: Quanta Computer, Inc., Tao Yuan Shien (TW)

( * ) Notice: Subject to any disclaimer, the term of this patent is extended or adjusted under 35 U.S.C. 154(b) by 272 days.

(21) Appl. No.: 11/028,429

(22) Filed: Jan. 3, 2005

(65) Prior Publication Data

US 2005/0201048 A1    Sep. 15, 2005

(30) Foreign Application Priority Data

Mar. 11, 2004  (TW) .............................. 93106453 A (51) Int. Cl.
*G06F 1/16* (2006.01)

(52) U.S. Cl. ..................... 361/683; 361/685; 361/724

(58) Field of Classification Search ................ 361/683, 361/685, 686, 724–727, 679
See application file for complete search history.

(56) References Cited

U.S. PATENT DOCUMENTS

| | | | | |
|---|---|---|---|---|
| 5,481,431 A | * | 1/1996 | Siahpolo et al. | 361/685 |
| 5,526,226 A | * | 6/1996 | Katoh et al. | 361/726 |
| 5,905,632 A | * | 5/1999 | Seto et al. | 361/683 |
| 6,283,438 B1 | * | 9/2001 | Shimada et al. | 361/683 |
| 7,090,528 B2 | * | 8/2006 | Tuttle et al. | 361/685 |

* cited by examiner

Primary Examiner—Lisa Lea-Edmonds
(74) Attorney, Agent, or Firm—Thomas, Kayden, Horstemeyer & Risley (57) ABSTRACT

An electronic device comprises a body, a recording medium, and a detachable element. The body comprises a first recess, defined in the body. The recording medium is disposed in the first recess. The detachable element is detachably disposed on the recording medium in a removal direction of the recording medium to hinder removal thereof.

16 Claims, 8 Drawing Sheets

ELECTRONIC DEVICE

BACKGROUND

The invention relates to an electronic device and in particular to a notebook computer with detachable external devices.

Notebook computers typically require various peripheral devices such as CD-ROM drives, floppy disk drives, memory card readers, and external hard disk drives. Due to demands for notebook computers with a thin profile and light weight and due to limited space therein, the optimal arrangement of peripheral devices is critical.

External hard disk drives can be easily connected to a notebook due to hot swap capability provided by most computer operating systems. If the external hard disk drive is incorrectly disconnected during operation of the notebook, however, some files may become corrupted and data may be lost, and the hard disk drive may be damaged. Particularly, when the notebook is used solely for playing music without turning on the screen, it is even seriously that user may carelessly remove the hard disk drive. Another problem is that because the hard disk drive is hot swappable, it may be easily stolen and reduces data security.

SUMMARY

Accordingly, an object of the invention is to provide an electronic device that eliminates the above described disadvantages.

An embodiment of the invention provides an electronic device comprising a body, a recording medium, and a detachable element. The body comprises a first recess, defined therein. The recording medium is disposed in the first recess. The detachable element is detachably disposed on the recording medium in a removal direction of the recording medium to hinder removal of the recording medium.

In an embodiment of the invention, the battery must be removed before removing the hard disk drive, to ensure that power to the hard disk drive is cut off before removing if from the notebook. Thus, an advantage of an embodiment of the invention is to prevent incorrect removal of the hard disk drive, and further avoid operational disruption that may cause data loss and drive damage. Furthermore, since the hard disk drive is contained in the first recess of the battery, the profile of the notebook remains compact, and provides additional space for other peripheral devices. Additionally, the hard disk drive is hidden in the first recess, decreasing the likelihood that the hard disk will be stolen.

DETAILED DESCRIPTION

Figure 1:
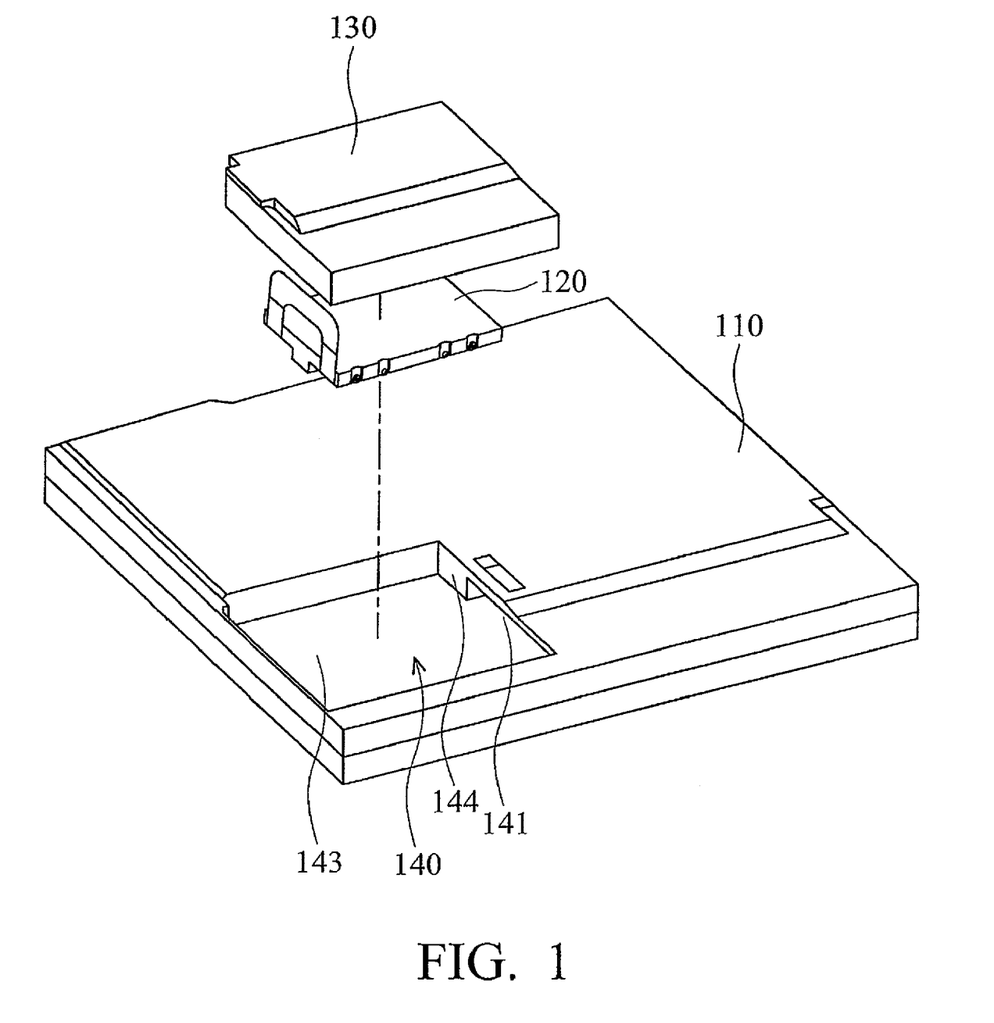
FIG. 1 is an exploded diagram of an electronic device according to an embodiment of the invention.

FIG. 1 is an exploded diagram of an electronic device 100 of an embodiment of the invention. In this embodiment, the electronic device 100 is a notebook computer comprising a body 110, a recording medium 120, and a battery 130. The body 110 comprises a first recess 140, defined in the body 110. The first recess 140 comprises a bottom 143, an opening and a sidewall 144 substantially perpendicular to the bottom 143. A second recess 141 is formed on the sidewall 144 of the first recess 140 and comprises a rectangular opening for containing the recording medium 120.

Figure 2:
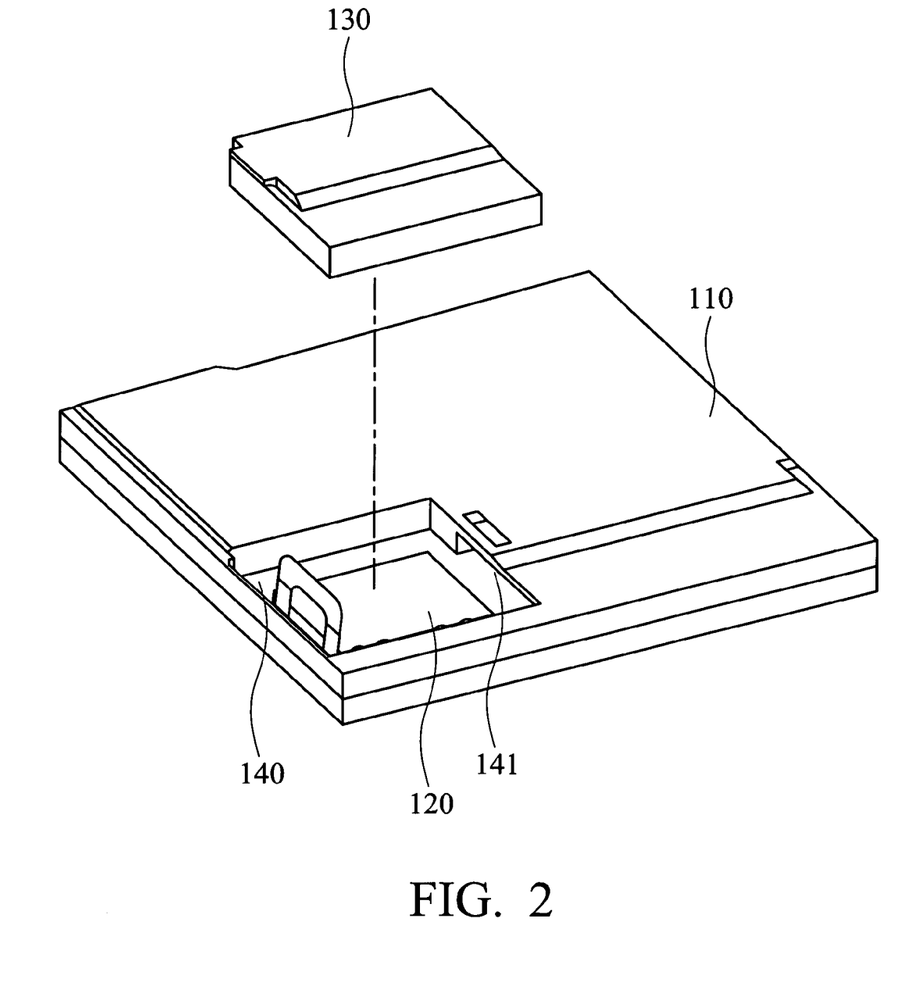
FIG. 2 is a schematic diagram of an embodiment of the invention wherein a hard disk drive is disposed in a first recess.
Figure 3:
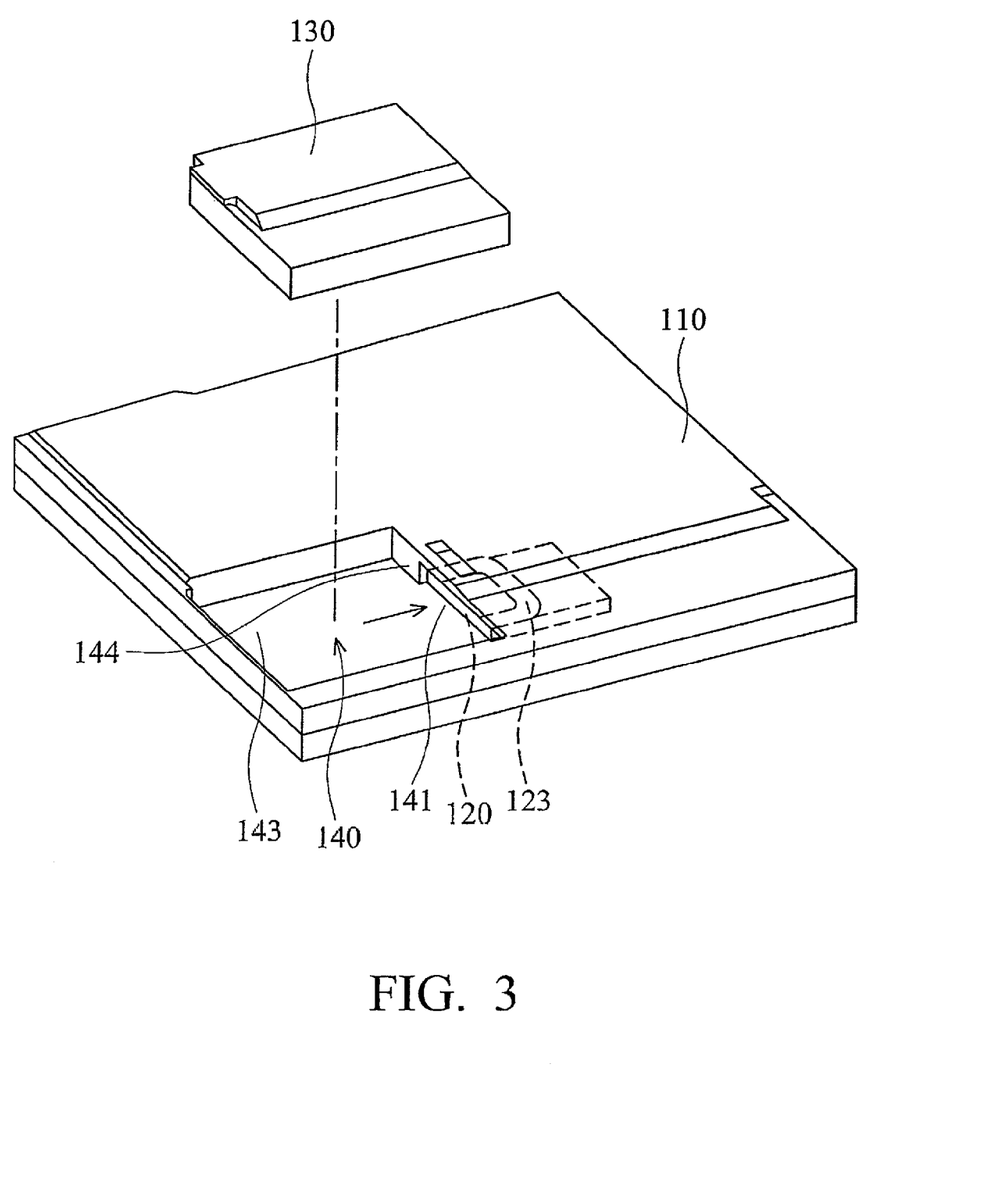
FIG. 3 is a schematic diagram of an embodiment of the invention wherein the hard disk drive is contained in a second recess.
Figure 4:
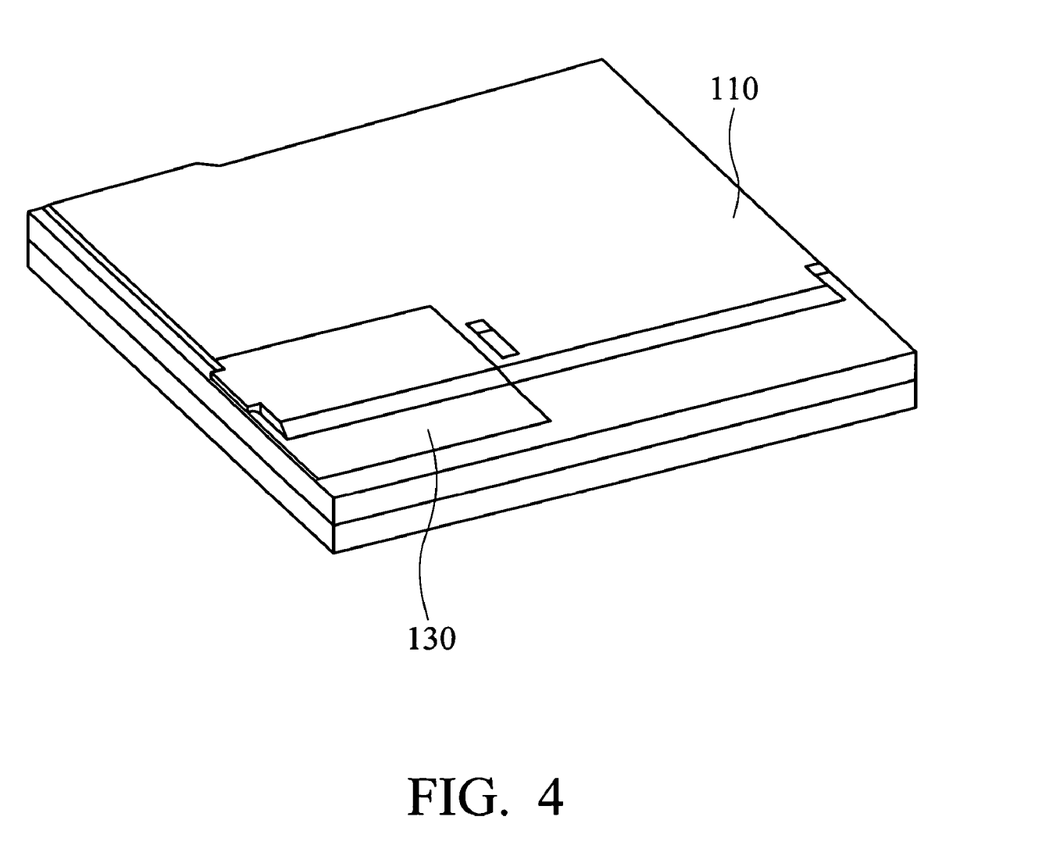
FIG. 4 is a schematic diagram of an embodiment of the invention wherein a battery is disposed in the first recess.

During assembly of the recording medium such as a hard disk drive 120, as shown in FIG. 2, the hard disk drive 120 is disposed in the first recess 140. Next, as shown in FIG. 3, the hard disk drive 120 is pushed toward the second recess 141 for insertion therein. Finally, in FIG. 4, the battery 130 is disposed in the first recess 140 and abuts the bottom 143 to complete assembly of the hard disk drive 120 and the battery 130.

Figure 5A:
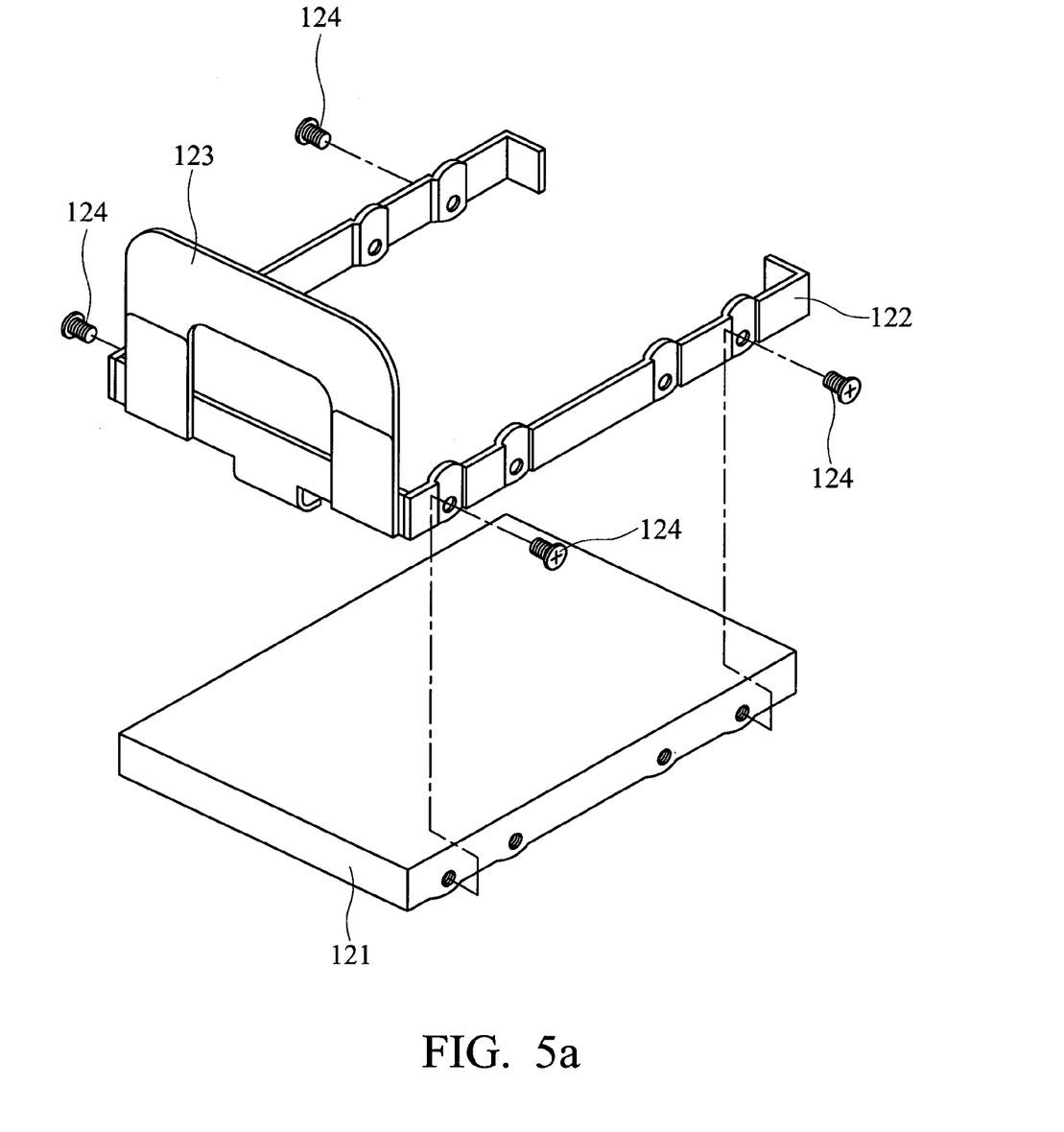
FIG. 5a is a schematic diagram of a hard disk drive.

FIG. 5a is a schematic diagram of the hard disk drive 120. The hard disk drive 120 comprises a positioning support 122, with a band 123 for extracting the hard disk drive 120 from the second recess 141. The positioning support 122 is engaged with the body 121 by screws 124, and the band 123 is made of polyester film material.

Figure 5B:
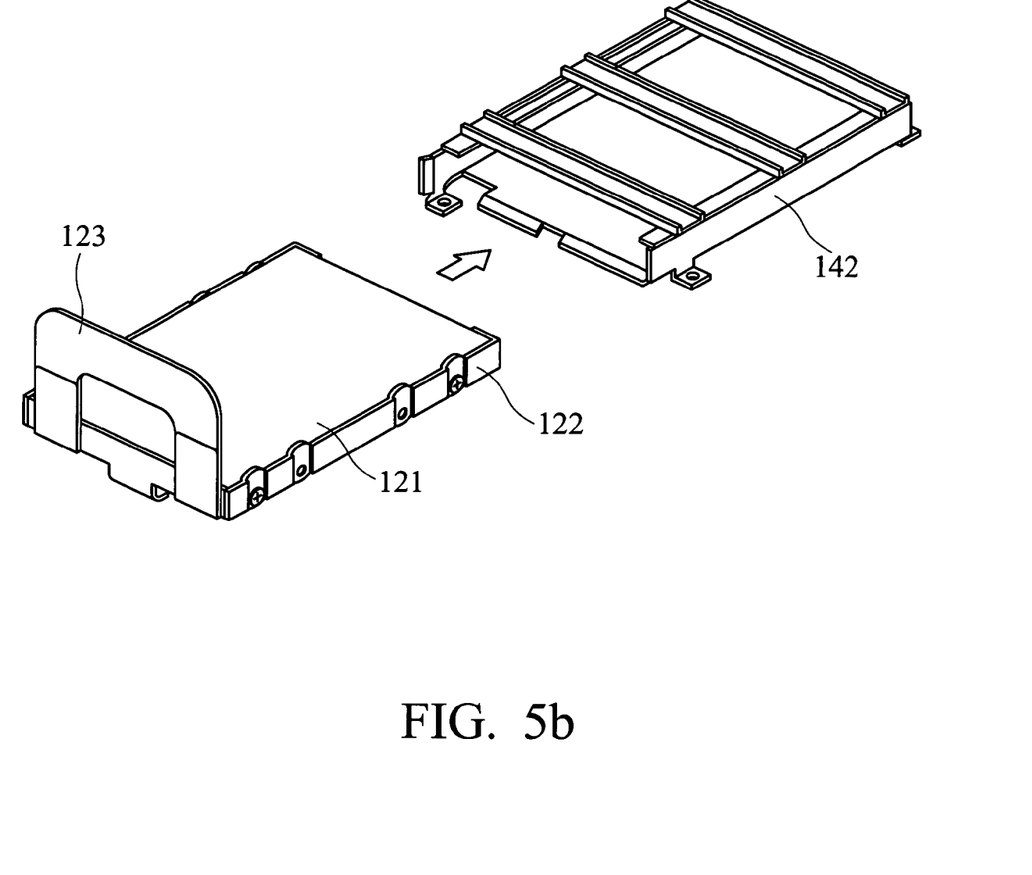
FIG. 5b is a schematic diagram showing a hard disk drive before insertion into a sliding structure.

As shown in FIG. 5b, the profile of the positioning support 122 corresponds to a sliding structure 142 in the second recess 141. Thus, the positioning support 122 can facilitate insertion of the hard disk drive 120 into the sliding structure 142.

Again as shown in FIG. 3, when the hard disk drive 120 is disposed in the second recess 141, the band 123 is bent and disposed between the hard disk drive 120 and the second recess 141.

Figure 6:
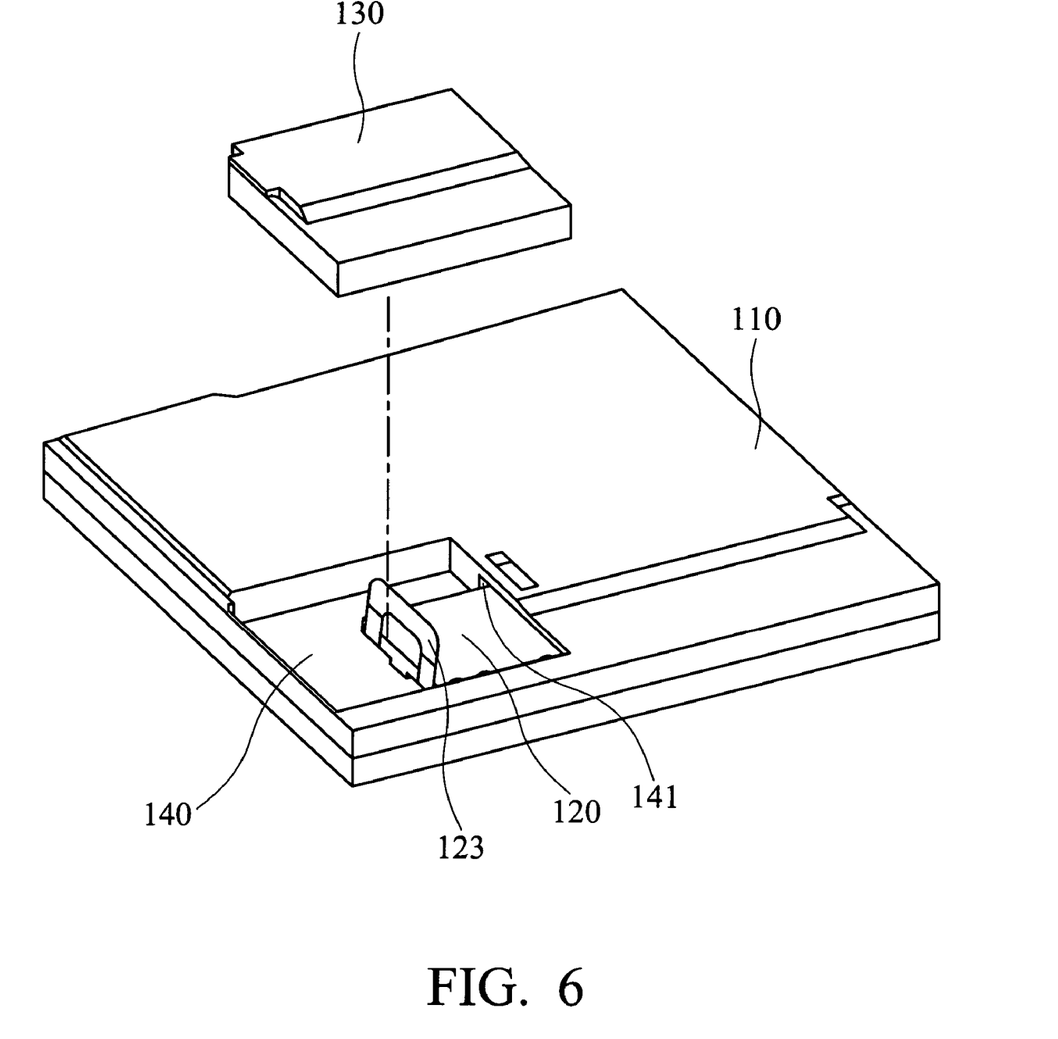
FIG. 6 is a schematic diagram showing the hard disk drive removed from the electronic device according to an embodiment of the invention.

In FIG. 6, to remove the hard disk drive 120, the battery 130 must be removed first, and the hard disk drive 120 can then be easily extracted from the second recess 140 by pulling the band 123.

In this embodiment, the battery 130 is disposed on the hard disk drive 120 in a removal direction thereof to hinder removal of the hard disk drive 120. Since the battery 130 is removed cutting off the power supply, the notebook is completely powered off when the hard disk drive 120 is removed, thus preventing data damage and loss.

Figure 7:
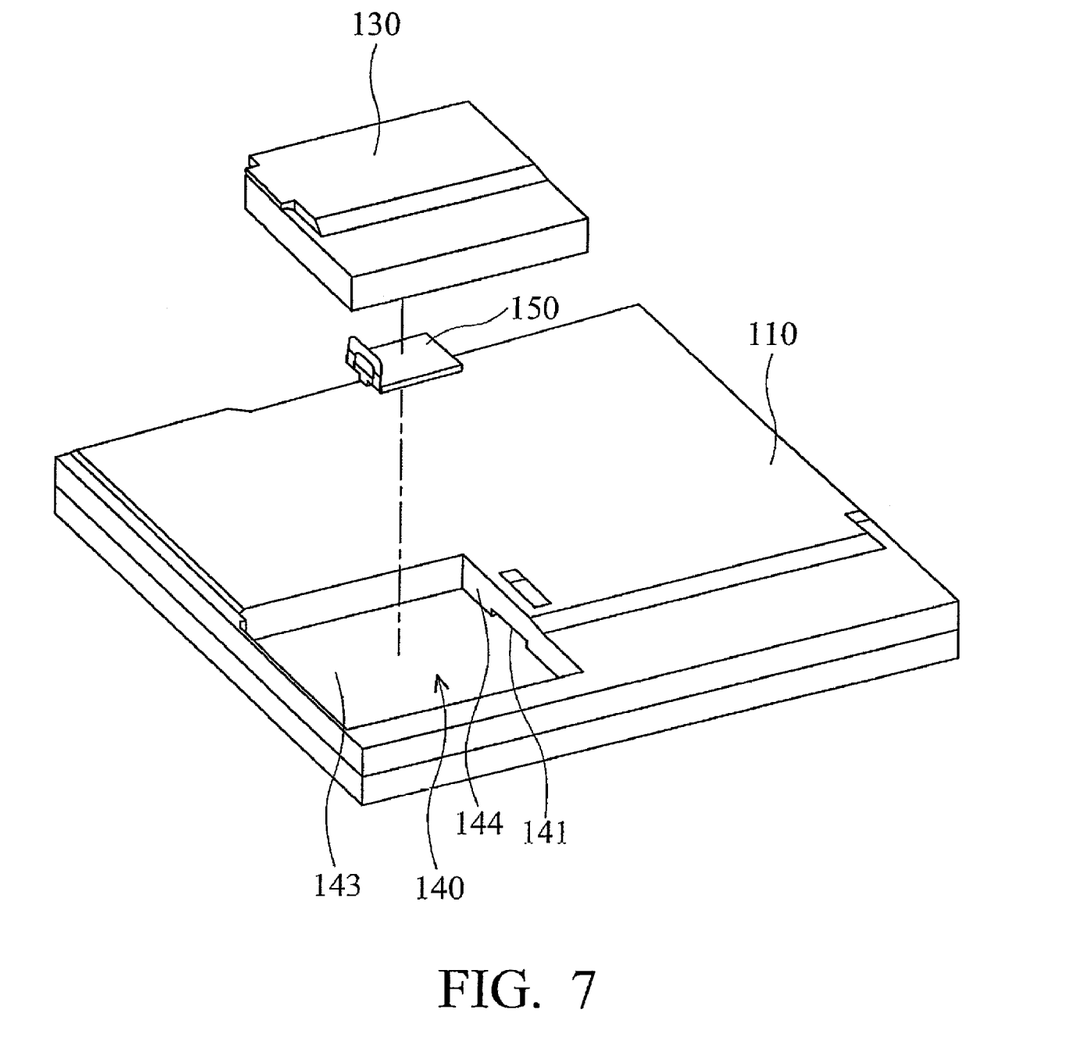
FIG. 7 is an exploded diagram of an electronic device according to an embodiment of the invention.

The recording medium can be a hard disk drive as mentioned above, a memory card 150 (as shown in FIG. 7), or other type of memory that can be disposed in the first recess 140.

As shown in the figures of the invention, the battery 130 and the recording medium 120 are disposed side by side in the first recess 140. In other embodiments, although not shown, the battery 130 may overlap the recording medium 120 and both may be disposed in the first recess 140. Namely, the recording medium 120 is disposed under the battery 130 such that removal of the recording medium 120 is further restricted by the battery 130.

In another embodiment, the hard disk drive 120 can be an advanced technology attachment (ATA) hard drive or serial advanced technology attachment (SATA) hard drive. When the hard disk drive 120 is an ATA hard drive, an embodiment may further comprise a converter for swapping.

In conclusion, the electronic device or notebook computer according to embodiments of the invention minimizes internal space, thus increasing available space for additional peripheral devices. The recording medium is hidden in the first recess to protect the data therein, thereby preventing easy removal thereof.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device, comprising:
    a body comprising a first recess defined therein, wherein the first recess comprises a bottom, a sidewall substantially perpendicular to the bottom, and a second recess formed on the sidewall;
    a recording medium, disposed in the second recess; and
    a detachable element, detachably disposed in the first recess, wherein the detachable element is detachably disposed nearby the recording medium in a removal direction of the recording medium to hinder removal thereof.

2. The electronic device as claimed in claim 1, wherein the first recess comprises an opening.

3. The electronic device as claimed in claim 1, wherein the recording medium is inserted in the second recess.

4. The electronic device as claimed in claim 1, wherein the second recess comprises a sliding structure, disposed therein, the recording medium is slidably inserted into the second recess along the sliding structure.

5. The electronic device as claimed in claim 4, wherein the recording medium comprises a positioning support, disposed thereon to facilitate insertion of the recording medium into the sliding structure.

6. The electronic device as claimed in claim 1, wherein the recording medium further comprises a band for extracting the recording medium from the second recess.

7. The electronic device as claimed in claim 6, wherein the band comprises polyester film material.

8. The electronic device as claimed in claim 6, wherein when the recording medium is disposed in the second recess, the band is deformed and disposed between the recording medium and the second recess.

9. The electronic device as claimed in claim 1, wherein the detachable element and the recording medium are disposed side by side in the first recess.

10. The electronic device as claimed in claim 1, wherein the detachable element is a battery.

11. The electronic device as claimed in claim 1, wherein the recording medium is a hard disk drive.

12. The electronic device as claimed in claim 1, wherein the recording medium is a memory card.

13. The electronic device as claimed in claim 1, wherein the electronic device is a notebook.

14. A notebook computer, comprising a recording medium and a detachable element, comprising:
    a body comprising a surface;
    a first recess, comprising a bottom and a sidewall substantially perpendicular to the bottom, defined on the surface with the detachable element disposed therein; and
    a second recess, communicating with the first recess, formed on the sidewall, wherein the recording medium is disposed in the second recess, the detachable element is disposed in a removal direction of the recording medium to hinder removal of the recording medium; wherein when the detachable element is disposed in the first recess, the recording medium is blocked by the detachable element, and after the detachable element is removed from the first recess, the recording medium is detachable from the body.

15. The notebook computer as claimed in claim 14, wherein the detachable element and the recording medium are disposed side by side in the first recess.

16. The notebook computer as claimed in claim 14, wherein the detachable element is a battery.

* * * * *